W. L. GEDDES.
AUTOMATIC PUMP.
APPLICATION FILED JULY 23, 1919.
1,330,072.
Patented Feb. 10, 1920.
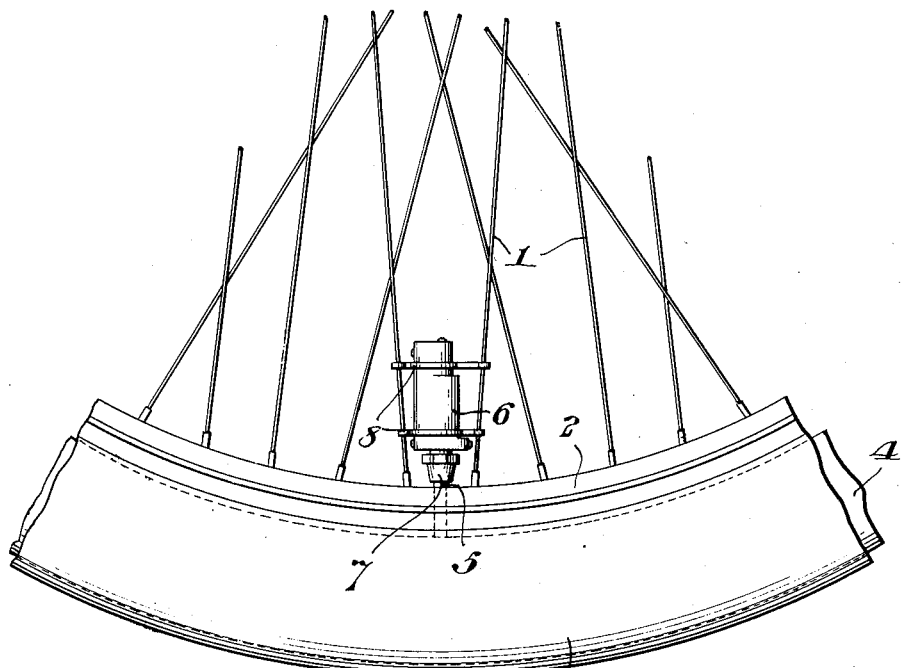
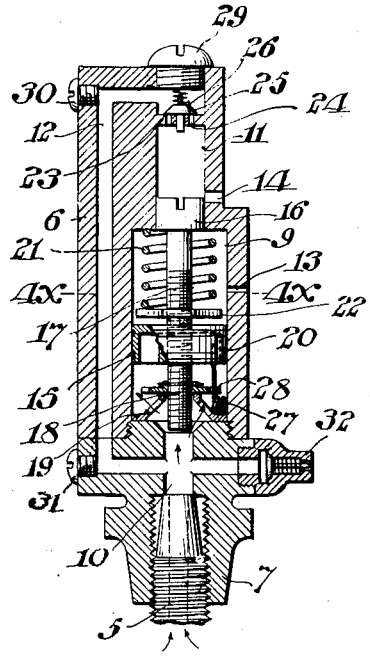
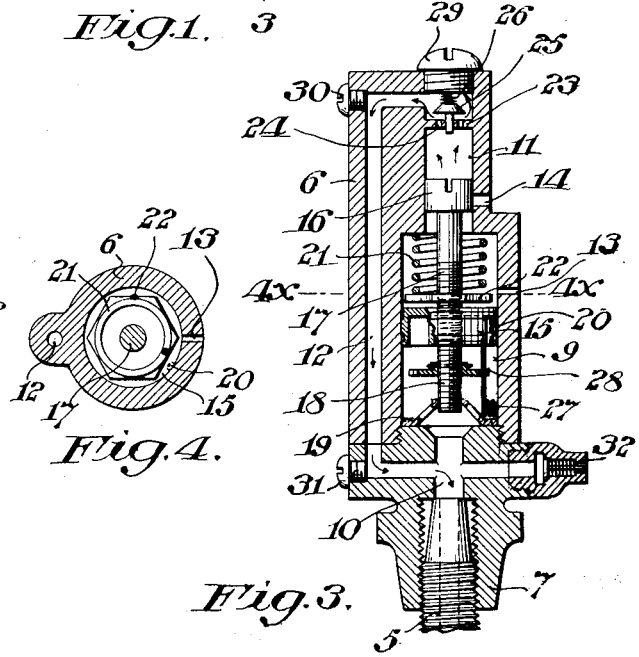
Inventor:
William L. Geddes,
By Chas. N. Butler
Attorney.

UNITED STATES PATENT OFFICE.

WILLIAM L. GEDDES, OF SUSSEX, NEW JERSEY.

AUTOMATIC PUMP.

1,330,072.　　　　Specification of Letters Patent.　　Patented Feb. 10, 1920.

Application filed July 23, 1919. Serial No. 312,807.

*To all whom it may concern:*

Be it known that I, WILLIAM L. GEDDES, a citizen of the United States, residing at Sussex, in the county of Sussex and State of New Jersey, have invented certain Improvements in Automatic Pumps, of which the following is a specification.

This invention is a pump designed primarily for application to wheels provided with pneumatic tires, especially pneumatic tires of motor vehicles, for the purpose of automatically effecting and maintaining the desired inflation through the pulsations of the air in the tubes due to the impact of the tires in the movement of the wheels.

In its preferred form, the invention comprises differential cylinders connected through a by-pass which communicates with the tube to be inflated under control of a non-return valve, in combination with differential pistons actuated against the action of a spring by pneumatic impulses from the tube, the smaller cylinder containing a port which is open for the admission of air when the pistons are retracted by the spring and closed when the pistons are advanced by the pneumatic impulses, the mechanism being provided with safety appliances for protection against over-inflation.

In the drawings, Figure 1 is a side elevation of a section of a motor vehicle wheel provided with the improvements; Fig. 2 is a longitudinal sectional view on an enlarged scale of the detached pump with the pistons retracted; Fig. 3 is a view similar to that shown in Fig. 2 with the pistons in the forward position and Fig. 4 is a sectional view taken on the line $4^x$—$4^x$ of Figs. 2 and 3.

The invention, in the form thereof illustrated in the drawings, comprises the combination of a wheel having the spokes 1, rim 2, shoe 3 and inner tube 4 having the nipple 5, with the pump 6 having the hollow ferrule 7 adapted to be connected in screw threaded engagement with the nipple, being fixed to the spokes by the clips 8.

The body of the pump contains the cylindrical chamber 9 in constant communication through the passage 10 with the tube 4 through the nipple 5, the concentric cylindrical chamber 11 of smaller diameter than the chamber 9, the passage 12 connecting the chamber 11 with the passage 10, the port 13 connecting the chamber 9 with the atmosphere and the port 14 connecting the chamber 11 with the atmosphere.

A piston 15 in the chamber 9 and a piston 16 in the chamber 12 are connected by a rod 17 having a stem 18 movable in open guides 19 fixed in the body, the piston 15 containing a passage 20 adapted to register with the port 13.

A thermostatic coil 27, in the chamber 9 adjacent to the passage 10, has one end anchored to the body 6 and the other end in variable or adjustable engagement with a notched bearing 28 on the stem 18, to provide means for turning the piston 15 when abnormally high temperature obtains in the tube 4 and securing relief to the atmosphere by effecting registration of the passage 20 with the port 13.

A spring 21, on the rod 17 between the pistons 15 and 16, acts against an adjustable bearing 22 having a threaded connection with the rod 17 and against the end of the chamber 9, between the pistons 15 and 16.

A diaphragm 23, between the chamber 11 and the passage 12, contains the ports 24 controlled by the check valve 25, which is provided with a spring 26 for pressing it toward and normally holding it upon its seat, formed by the diaphragm, to close the ports therethrough.

For convenience in construction, assemblage and repair, the outer end of the body 6 in line with the passage 11 can be opened by the screw plug 29 (which supports the spring 26) into the passage 12, the lateral sections of the passage 12 extend through a side of the body and are closed by the screw plugs 30 and 31, and the section closed by the plug 31 extends across the passage 10 through the opposite side of the body and is closed by a check valve 32, providing means for inflating the tube through a usual hose connection.

In the normal operation of the mechanism, the irregular impact of the tire upon the road bed causes pneumatic impulses to be communicated from the confined air through the passage 10 to the chamber 9, where it acts against the piston 15, which actuates the piston 16 and compresses the spring 21. Air admitted to the chamber 11 through the port 14 in the retracted positions of the pistons is forced by the piston 16 through the ports 24 and the passage 12 into the passage 10 and thence through the nipple 5 into the inner tube 4. In the reverse movement of the pistons caused by the spring 21 at the end of the impulse, the valve 25 closes and prevents the reverse flow of air through the passage 12.

When the desired inflation has been obtained thus, the pressure communicated through the passage 10 to the chamber 9 is sufficient to cause the piston 16 to hold the port 14 closed against the action of the spring 21 so that no further air is admitted while the desired pressure is maintained. If, however, the pressure in the tire falls below that desired, the spring 21 retracts the pistons so as to uncover the port 14 and additional air is pumped into the tube.

When, due to abnormal temperature conditions, there is danger of overinflation, the thus expanded thermostatic coil 27 acts through the bearing 28 and turns the piston 15 so as to effect registration of the passage 20 with the port 13, thereby establish communication with the atmosphere relieving the pressure in the tube and thus providing relief.

It will be understood that the pump may be detached readily to change tires and that a flat tire may be inflated by connecting a usual pump with the passage 10 by means of the valve 32.

Having described my invention, I claim:

1. The combination with a pneumatic tire, of a pump having a piston chamber communicating with the interior of said tire, a second piston chamber of smaller cross-section than said chamber first named, connected differential pistons acting in the respective chambers, the smaller chamber having a port adapted for admitting air thereto and adapted to be controlled by the smaller piston, a passage connecting said chambers around said pistons, means for preventing reverse flow through said passage, and means for retracting said pistons.

2. A pump having differential piston chambers, connected differential pistons in the respective chambers, a passage connecting said chambers around said pistons, a check valve for preventing reverse flow through said passage, a port controlled by the smaller piston for admitting air to the smaller chamber, and means for retracting said pistons to open said port.

3. A pump having piston chambers of different cross-section, connected pistons of different cross-sections in the respective chambers, a passage communicating with the chamber of larger cross-section back of said pistons, a passage connecting said passage with the smaller of said chambers in front of said pistons, a valve for preventing flow through said passage second named to the smaller of said chambers, a spring against which said pistons act, and a port communicating with the smaller of said chambers and controlled by the smaller of said pistons.

4. A pump having means for attaching it to a pneumatic tire, a piston chamber adapted to receive air impulses from said tire, a piston in said chamber adapted to be actuated by said impulses, a second piston chamber of smaller cross-section than said chamber first named, a piston connected with said piston first named and movable thereby in said piston chamber second named, an air port communicating with said chamber second named and controlled by said piston second named, a passage adapted to connect said chamber second named with the interior of said tire, and a valve for preventing reverse flow through said passage to said chamber second named.

5. A pump having piston chambers of different cross-sections, connected pistons acting in the respective chambers, a port communicating with the chamber of smaller cross-section under control of the piston therein, a passage for communicating pneumatic pressure to the larger of said chambers for actuating said pistons, a passage connected with the smaller of said chambers through which the smaller of said pistons communicates pneumatic pressure, a valve for preventing reverse flow through said passage second named to the smaller of said chambers, and means for preventing excess pressure in said passage or passages.

6. A pump having differential piston chambers, differential pistons in said chambers, a passage connecting said chambers around said pistons, a check valve for preventing reverse flow through said passage from the chamber of larger to the chamber of smaller cross-section, and means for providing operating fluid pressure to the chamber of larger cross-section.

7. A pump having differential piston chambers, differential pistons in said chambers, a passage whereby operating fluid pressure is supplied to the chamber of larger cross-section, a safety valve for relieving excess pressure in said passage, a passage leading from the chamber of smaller cross-section and a check valve for preventing reverse flow through said passage last named.

8. A pump having a piston chamber provided with a port, a piston adapted to reciprocate in said chamber, said piston having a passage adapted to register with said port, and a thermostat adapted for effecting registration between said passage and port.

9. A pump having a piston chamber provided with a port, a piston adapted to reciprocate in said chamber, said piston having a passage adapted to be turned into position for registration with said port, and a thermostatic coil adapted to turn said piston to effect registration between said passage and port.

In testimony whereof I have hereunto set my name this 21st day of July, 1919.

WILLIAM L. GEDDES.